United States Patent [19]

Langdon

[11] 4,191,820

[45] Mar. 4, 1980

[54] PROCESS FOR PREPARING POLYALKYLENE POLYAMINE POLYETHERS

[75] Inventor: William K. Langdon, Grosse Ile, Mich.

[73] Assignee: BASF Wyandotte Corporation, Wyandotte, Mich.

[21] Appl. No.: 866,206

[22] Filed: Jan. 3, 1978

[51] Int. Cl.² ........................ C08G 73/02; C08G 65/26
[52] U.S. Cl. ............................. 528/405; 260/29.2 EP; 260/584 B
[58] Field of Search ................ 260/2 A, 2 BP, 584 B; 528/405

[56] References Cited

U.S. PATENT DOCUMENTS

| | | |
|---|---|---|
| 3,251,852 | 5/1966 | DeGroote et al. ............... 260/309.6 |
| 3,331,788 | 7/1967 | Lorensen et al. ........................ 260/2 |
| 3,746,678 | 7/1973 | Dick et al. ............................. 260/2 A |
| 3,753,931 | 8/1973 | Raspanti et al. .................... 260/2 BP |
| 4,056,510 | 11/1977 | Symm et al. .................... 260/47 EP |

*Primary Examiner*—Earl A. Nielsen
*Attorney, Agent, or Firm*—Joseph D. Michaels; Arnold S. Weintraub

[57] ABSTRACT

Non-gelled polyalkylenepolyamine polyethers are prepared by the reaction of ethylenediamine and polyepichlorohydrin in the presence of an organic solvent. The solvent enables the reactants to be present at less than a 3:1 ratio of polyamine per chlorine atom.

7 Claims, No Drawings

PROCESS FOR PREPARING POLYALKYLENE POLYAMINE POLYETHERS

BACKGROUND OF THE INVENTION

1. Field of the Invention

The present invention pertains to polyalkylenepolyamine polyethers. More particularly, the present invention pertains to processes for the preparation of such polyethers. Even more particularly, the present invention concerns processes for the preparation of such polyethers by the reaction of an alkylenepolyamine and an epihalohydrin.

2. Prior Art

The preparation of condensation products by the reaction of an amine and an epihalohydrin is well documented in the prior art. Within this broad class of compounds numerous sub-classes have been denoted. Thus, the reaction of alkylamines and epihalohydrins has been documented numerous times.

Generally, this latter sub-class of compounds have been developed to enhance the properties of paper, to provide improved drainage aids and so forth.

As the art has developed, there has been an increasing amount of activity toward the development of polyalkylenepolyamine polyethers as wet and dry strength paper additives; drainage aids; flocculants and the like. Furthermore, such compounds often define intermediate for the preparation of other compounds, such as surfactants, ion exchange resins and the like. In preparing such polyethers, normally, an alkylamine is reacted with a polyhalohydrin under controlled conditions. The controlled conditions are necessary in order to preclude and prevent cross-linking of the reactants. Cross-linking provides a water-insoluble, gelled mass which is of substantially no utility. On the other hand, control of the reaction conditions provides water-soluble highly useful compounds.

Within the context of controlling the reaction conditions, the art has taught maintaining a strict molar ratio minimum. Falling below the minimum results in highly cross-linked products. The art, also, teaches control of temperatures and reaction times.

In U.S. Pat. No. 3,746,678, there is taught the reaction of ethylene diamine and polyepichlorohydrin. The reference specifically discloses that at least about three moles of polyamine be reacted per chlorine atom in the chlorinated alkylene oxide polymer. The reference further teaches that using a ratio of less than 3:1 is an inoperable procedure.

As will subsequently be detailed, the present invention provides a process whereby ratios of less than 3:1 can be utilized to prepare non-gelled polyalkylene polyamine polyethers by the reaction of an alkylamine and a polyhalohydrin.

STATEMENT OF RELEVANT ART

To the best of applicant's knowledge, the following is the most relevant prior art:
U.S. Pat. No. 3,746,678
U.S. Pat. No. 3,497,556
U.S. Pat. No. 3,031,505
U.S. Pat. No. 1,977,253.

SUMMARY OF THE INVENTION

In accordance with the present invention, water-soluble amine-derived polyethers are prepared by reacting an amine with a halogen-containing polymer of an epihalohydrin in the presence of an organic solvent which defines a diluent for the amine reactant. Specifically, the present invention enables the production of water-soluble amine-derived polyethers with reduced molar quantities of amine reactant.

Any amine can be used herein, such as, alkylamines, polyalkylene polyamines, alkylenepolyamines, polyoxyalkylene amines, cyclic amines, such as piperazine, and the like.

The halogenated epoxides used to carry out the reaction are, preferably, the epihalohydrins, as noted.

Any solvent can be utilized herein which is non-reactive with either of the reactants. Ordinarily, the condensation reaction proceeds at high temperatures to minimize cross-linking. Therefore, optimally, high boiling point solvents, such as glycals and derivatives thereof, toluene, xylene and the like can be used herein.

In a preferred embodiment of the present invention, ethylenediamine and polyepichlorohydrin are reacted in the presence of an organic solvent in a ratio of less than three moles of amine per chlorine atom in the alkylene oxide polymer.

For a more complete understanding of the present invention reference is made to the following detailed description and accompanying examples.

DESCRIPTION OF THE PREFERRED EMBODIMENTS

Generally, and in accordance with the present invention, there is provided a process for the production of amine-based or derived polyethers, by reacting an amine and a halogenated epoxide in the presence of an organic solvent.

More particularly, the present invention provides a process for the preparation of a polyalkylene polyamine polyether by the reaction of: (a) an alkylenepolyamine and (b) a polyepihalohydrin in the presence of an organic solvent.

The reaction is carried out at elevated temperatures. Ordinarily, reactions of amines with halogen-containing polyethers proceed at temperatures ranging from about 25° C. to about 200° C., at ambient pressures. The preferred temperature range is 120° C. to about 180° C. since these elevated temperatures result in rapid reactions of halogen and amine groups. This minimizes and discourages cross-linking reactions. Thus, the present invention, preferably, employs solvents having boiling points of 120° C. and above. However, lower boiling solvents can be used if the reaction is carried out under superatmospheric pressures. Thus, in practicing the present invention the one criticality which attaches to the solvent is that it be capable of withstanding the reaction temperature.

The process of the present invention is particularly adapted for preparing non-gelled polyamines from the reaction of an alkylenediamine and a polyepihalohydrin at a less than 3:1 ratio, and as low as 2:1 or less, of amine to available halogen atom in the epoxide. Although the present invention is applicable to any epoxide-amine reaction, the process is, as noted, eminently efficacious for the diamine polyepichlorohydrin reaction.

Hence, in accordance herewith any amine, such as monoalkylamines, alkylene polyamines, polyalkylenepolyamines, cyclic amines, and the like can be used herein. Representative monoalkylamines include methylamine, ethyl amine, propylamine, i-propylamine, n-propylamine, n-butylamine, i-butylamine, t-butylamine and so forth. Representative alkylene polyamines include ethylenediamine, propylenediamine, 1,2,3-triamino propane, butylenediamine, triaminobutane and so forth. Suitable polyalkylenepolyamines include diethylene triamine, dipropylenetriamine, triethylenetetramine, and so forth. Suitable cyclic amines are represented by piperazine and the like. In addition to primary amines, secondary or tertiary amines can be used if quaternary end products are desired. Furthermore, the amine may be substituted or unsubstituted. Where substituted, it is preferred, that the substituent be non-reactive with either the solvent or the halogenated epoxide.

As heretofore noted, and in accordance with the preferred embodiment hereof, the amine most efficaciously employed herein is an alkylenepolyamine, such as ethylenediamine. The other reactant used herein is a halogenated polyether prepared from a halogenated epoxide. Representative halogenated epoxides used as intermediates for the polyhaloethers include epichlorohydrin, epibromohydrin, 3-chloro-1,2-epoxy butane, 3-bromo-1,2-epoxy butane, 1-chloro-2,3 epoxy butane and the like. Thus, halogen substituents include chlorine, bromine, and iodine and preferably chlorine, are useful herein.

In practicing the present invention, again, the halogenated epoxide may be further substituted. However, the substituent must be non-reactive with either the amine or the solvent. Preferably, the epoxide is not otherwise substituted. In carrying the present invention, the preferred epoxide is an oligomer of epichlorohydrin, to wit, polyepichlorohydrin.

Polyepichlorohydrin is, of course, produced by polymerizing epichlorohydrin by any well known method, such as by reacting epichlorohydrin with water in the presence of a Lewis acid catalyst.

The solvents utilized herein comprise any non-reactive solvents which can withstand the elevated reaction temperatures, i.e. >100° C. Thus, glycols, glycol ethers, aromatic hydrocarbons and the like can be used herein. Useful glycols include diethylene glycol, propylene glycol and the like. Suitable glycol ethers include monoethers, such as ethylene glycol monobutyl ether, diethylene glycol monoethyl ether and the like, polyethers such as diethylene glycol diethyl ether and the like. Representative aromatic solvents are toluene, xylene and the like. Any of the above-denoted solvents as well as mixtures thereof are applicable to the present process.

In a preferred embodiment of the present invention, propylene glycol is the preferred solvent.

The solvent is employed in any amount sufficient to maintain the amine in solution therewithin.

In practicing the present invention, the amine is admixed with the solvent and is heated to a temperature in excess of 120° C. Thereafter, the selected halogenated polyether is added thereto and the reaction is carried out at a temperature of about 150° C. for about one to twenty-four hours, depending on the reactants.

In a preferred embodiment of the present invention, the process hereof, as above noted, is used to prepare polyethers from the reaction of polyepichlorohydrin and ethylene diamine, in an organic solvent, at a ratio of less than 3 moles of diamine per gram atom of chlorine. The reaction is carried out within the parameters set forth above. The products are non-gelled polyamines which are useful as intermediates for the preparation of drainage aids, as well as other products.

The polyamines prepared in accordance herewith are substantially linear structures of the formula:

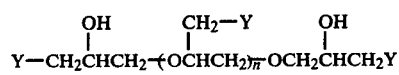

wherein Y represents a polyamine function or an amine function, and, preferably,

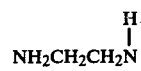

and n ranges from about one to thirty. In addition, there is some cross-linking due to the intermolecular action of the diamine and the pendant chloromethyl groups. The present invention, as noted, minimizes the cross-linking to provide the non-gelled products hereof.

For a more complete understanding of the present invention reference is made to the following examples. In the examples, which are to be construed as illustrative, rather than limitative of the present invention, all parts are by weight, absent indications to the contrary.

EXAMPLE I

Into a reaction flask equipped with a stirrer, thermometer, addition funnel and reflux condenser was charged one hundred and eighty parts of ethylenediamine and one hundred and eighty-four parts of propylene glycol. The solution was heated to 118° C. and, then, one hundred and forty-three parts of hexaepichlorohydrin was added thereto over about a one hour period. During this time the temperature in the flask was allowed to increase to 149° C. The reaction was highly exothermic, maintaining a rapid reflux of ethylenediamine.

After the addition was completed the mixture in the flask was stirred for about one hour at about 150° C. to about 160° C., and, then, left to stand for about fifteen hours.

Thereafter, excess diamine and solvent were stripped from the flask at 142° C. and 10 torr. The product in the flask (two hundred forty-three parts) was, then, diluted with one hundred and sixty-two parts of water to provide four hundred and five pats of a solution calculated as having 60% polyamine polyhydrochloride.

EXAMPLE II

Using apparatus of the type described in Example I, one hundred and eighty parts of ethylene diamine and five hundred and forty parts propylene glycol were charged into the flask. The solution was stirred at 142° C. Then, one hundred thirty-eight and one-half parts of a thirty unit polyepichlorohydrin oligomer was added thereto, with stirring. The addition occurred over a ninety minute period during which time the temperature in the flask rose to 157° C.

After letting the product stand for a few hours, excess diamine and solvent were stripped by distilling at a temperature of up to 150° C. and 5 torr. A yield of two hundred fifty-eight and seven-tenths of product was obtained which was diluted with one hundred and seventy-two parts of water to give a 60% solution of polyamine polyhydrochloride.

Analysis for amino nitrogen was 7.22% corresponding to 1.57 moles of ethylenediamine reacting per available chlorine atom. Theoretical calculations showed 1.5 moles of diamine to react per atom of available chlorine.

EXAMPLE III

This example shows the results of carrying out the reaction at too low a temperature.

Using a flask equipped as described in Example I, four hundred and eighty parts of ethylenediamine and nine hundred and sixty parts of propylene glycol were charged to the flask. The mixture was heated at 115° C. Then, three hundred and seventy-eight parts of decaepichlorohydrin was added thereto over a sixty-seven minute period at a temperature fluctuating between 115° C. and 136° C. After a fifteen minute post reaction period, excess diamine and glycol solvent were stripped off by distillation at a temperature of about 120° C. at 30–50 torr. The product gelled, due to the low reaction temperature.

EXAMPLE IV

Example III was repeated, except that the amine-glycol solution was heated to 155° C. and one hundred and eighty-nine parts of the chlorohydrin was added thereto over a thirty minute period. During this period, the temperaure in the flask rose to 170° C. After the addition was completed the product was allowed to stand for about twenty hours. Then, the excess glycol and amine were stripped at 118° to 122° C. during which time the pressure reduced from 40 torr to 5 torr. A yield of three hundred twenty and seven-tenths of product was obtained. The product was then diluted with two hundred thirteen and seven tenths of water to provide a 60% polyamine polyhydrochloride.

EXAMPLE V

This example shows the preparation of a paper pulp drainage aid from an intermediate prepared by the process of the present invention.

Using the product of Example IV, one hundred parts of the 60% hydrochloride solution was diluted with ninety parts of water. Thirty parts of sodium hydroxide (50%) was added thereto to neutralize the hydrochloride. This solution was, then, heated to 99° C. and one hundred and twenty-three and two-tenths parts of a 20% solution of a chlorohydrin ether polyol was added thereto. The polyol comprised the reaction product of epichlorohydrin and a 400 molecular weight polyoxypropylene glycol prepared by the reaction of propylene oxide and propylene glycol.

The resulting solution had a viscosity of 21.1 seconds as determined by the Ford cup. Thus, an additional twelve and eight-tenths parts of the polyol was added to the solution to increase the Ford cup viscosity to 115 seconds. The, thus, obtained three hundred and fifty-three parts of product was evaluated as a drainage aid using the Canadian freeness procedure. The product performed extremely well.

EXAMPLE VI

Using equipment similar to that described in Example I, one hundred and eighty parts of ethylene diamine and three hundred and sixty parts of propylene glycol were added to the flask and heated to 148° C. Thereafter, one hundred and thirty-nine parts of a twenty unit polyepichlorohydrin was added over a ninety minute period at a temperature of 148° C. to 154° C.

After the addition was completed, excess diamine and solvent were stripped off up to a temperature of 138° C. at 4 torr. A yield of two hundred and fifty-six and two-tenths of product was obtained which was diluted to a 60% polyamine polyhydrochloride solution with one hundred and seventy parts of water.

This product was then reacted with the same polyol and by the same procedure described in Example V. The product was then tested as a drainage aid using the Canadian freeness procedure. The product performed extremely well.

In each of the examples, a mole of amine to available chlorine atoms ratio of 2:1 was used.

In addition to their use as intermediates the products produced hereby which are polyamine polyethers, are useful as intermediates for preparing retention aids; dry and wet strength paper additives; flocculants for metal aids and both industrial and domestic sewage wastes; intermediates for preparing cationic and amphoteric surfactants; intermediates for quaternary ammonium salts for ion exchange resins, as well as other uses evident to the skilled artisan.

The use of the solvent process hereof enables the reduction of the amount of expensive amine used resulting in reduced costs and lower recovery costs.

Having, thus, described the invention, what is claimed is:

1. A method for preparing a water-soluble amine-derived polyether, comprising:
   reacting ethylenediamine with a halogen-containing polymer of an epihalohydrin in the presence of an organic solvent at a temperature ranging from about 120° C. to about 200° C., and
   wherein the ratio of moles of ethylenediamine per available halogen atom is less than 3:1.

2. The method of claim 1 wherein the reaction proceeds at a temperature of from about 120° C. to about 180° C.

3. The method of claim 1 wherein the solvent is selected from the group consisting of glycols, glycol ethers, aromatic hydrocarbons and mixtures thereof.

4. The method of claim 1 wherein:
   the epihalohydrin is epichlorohydrin.

5. The method of claim 1 wherein:
   the solvent is propylene glycol.

6. The method of claim 1 wherein:
   the epihalohydrin is epichlorohydrin and the solvent is propylene glycol.

7. The method of claim 1 wherein the polyether corresponds to the formula:

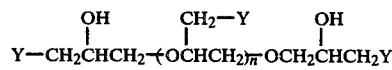

and wherein Y is either an amine or polyamine function and n is an integer ranging from about one to about thirty.